Figure 1:
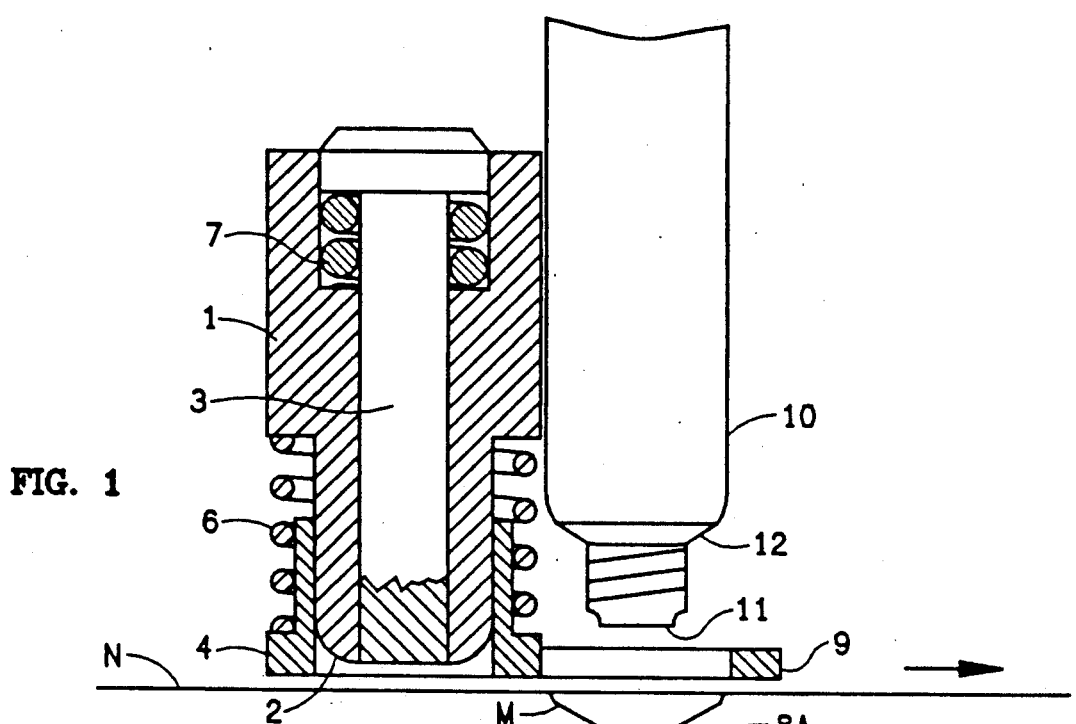

United States Patent [19]

Mäkilaakso

[11] Patent Number: 5,041,180
[45] Date of Patent: Aug. 20, 1991

[54] METHOD AND DEVICE FOR SEAMING THE END OF A TUBE

[75] Inventor: Antero Mäkilaakso, Espoo, Finland
[73] Assignee: Makilaakso Oy, Finland
[21] Appl. No.: 474,557
[22] Filed: Feb. 2, 1990

[30] Foreign Application Priority Data

Feb. 6, 1989 [FI] Finland ................................. 890553

[51] Int. Cl.⁵ .............................................. B65B 7/14
[52] U.S. Cl. ..................................... 156/69; 156/245;
156/252; 156/381; 156/475; 156/518; 53/478;
215/232
[58] Field of Search ........................ 215/232, 249, 250;
220/265, 277; 156/69, 245, 518, 520, 252, 381,
475; 53/478, 485, 487, 488; 222/107

[56] References Cited

U.S. PATENT DOCUMENTS

| | | | |
|---|---|---|---|
| 3,700,513 | 10/1972 | Haberhauer et al. .................. | 156/69 |
| 3,962,006 | 6/1976 | Saito et al. .......................... | 156/69 X |
| 4,132,331 | 1/1979 | Magerle ............................. | 156/69 X |
| 4,448,829 | 5/1984 | Kohler ............................... | 156/69 X |
| 4,568,001 | 2/1986 | Sander ............................... | 156/69 X |
| 4,750,642 | 6/1988 | Eckstein et al. ..................... | 156/69 X |
| 4,792,061 | 12/1988 | Nisida ................................ | 222/107 |
| 4,961,796 | 10/1990 | Perrin et al. ........................ | 156/69 |

FOREIGN PATENT DOCUMENTS 0068835 1/1945 Norway .
0069265 5/1945 Norway .
1598267 9/1981 United Kingdom .

Primary Examiner—Michael W. Ball
Assistant Examiner—Mark A. Osele
Attorney, Agent, or Firm—Walter H. Dreger

[57] ABSTRACT

A method and a device for seaming the end of a tube. In the method, the shell of the tube is placed onto the shoulder of the end piece, a sleeve ring is placed where the joint is to be produced, and the seaming is effected by smelting in a seaming element a plastic layer provided on the sleeve ring, tube shell and/or end piece. The invention is so implemented that the sleeve is formed from a foil band supplied into a tube end seaming unit in such a way that the sleeve or its central part is not yet detached from the band, the sleeve is moved along with the band into the seaming unit, where the sleeve is first detached from the band by the seaming element, whereupon the sleeve is moved onto the orifice of the tube end piece, the central part of the sleeve is cut off and forms a sealing cover on the orifice, and the ring-shaped sleeve thus produced is moved onto the shoulder of the tube end piece, where it is pressed against the end piece shoulder and the end of the tube shell to cover the joint between them, whereupon the seaming element is heated to join the sleeve ring with the shoulder of the end piece while the central part of the sleeve is joined with the edges of the end piece orifice to produce a sealing cover on it.

7 Claims, 1 Drawing Sheet

METHOD AND DEVICE FOR SEAMING THE END OF A TUBE

The present invention relates to a method and a device for seaming the end of a tube, and to a tube produced by the method, in which method the shell of the tube is placed onto the shoulder of the end piece, a sleeve ring is placed where the joint is to be produced, and the seaming is effected by smelting in a seaming element a plastic layer provided on the sleeve ring, tube shell and/or end piece.

At present, tubes are often produced from pretreated foil by rolling the foil into a tube shell, one end of which is then joined with an end piece provided with an opening while the other end is closed tightly by pressing and seaming. The end of the shell is first bent over the shoulder of the piece, whereupon an end ring or sleeve ring of a specific shape is placed on top of the end piece shoulder and the shell end bent over it, whereafter the whole assembly can be joined together e.g. by heating to produce a tight and neat tube structure.

A drawback with previously known tube seaming methods is that they involve a relatively large number of stages of operation, thus limiting the rate of production of tubes. Moreover, the sleeve ring is expensive to produce because it is generally cut from the same multilayer foil as the tube shell itself and, being ring-shaped, causes considerable waste of raw material.

The object of the present invention is to reduce the number of stages of operation required, to avoid the above-mentioned drawbacks and to achieve a considerable improvement in the quality/price ratio for the tubes manufactured. Thus, the method of the invention is characterized in that a) the sleeve is shaped, cut and/or perforated so as to render it easily detachable from the foil band when brought into a tube end seaming unit; b) the sleeve thus prepared is moved along with the band into the seaming unit, where the sleeve is first detached from the band by a seaming element moving in a direction perpendicular to the plane of the band; c) the sleeve is moved along with the seaming element to the orifice of the tube end piece, where the central part of the sleeve is cut off and forms the cover of the orifice; d) the sleeve ring thus produced is moved onto the shoulder of the tube end piece, where it is pressed in a manner known in itself against the end piece shoulder and the end of the tube shell, covering the joint between them; and e) by heating or using of some other form of radiated energy, the seaming element is brought into a condition causing the smelting of a plastic layer provided in the sleeve ring and/or tube shell, and, essentially simultaneously and in step, the sleeve ring is joined with the shoulder of the end piece while the central part of the sleeve, which was left on the end piece orifice, is joined with the edges of the orifice to produce a cover on it.

The main advantages of the invention are the small number of stages of operation and the fact that, without involving additional stages of operation or losses of raw material, the end piece orifice is provided with a seal enhancing the hygienic aspect of the tube.

A preferred embodiment of the invention is characterized in that the shaping, cutting and/or perforation of the sleeve are performed essentially simultaneously and in step with the joining onto a tube end piece of at least one other sleeve, the next one in the direction of motion of the band. Assembling the tube thus requires only two stages of operation, whereas assembly with current techniques requires at least four stages (cutting the sleeve off the band, transfer into assembling unit, positioning in the appropriate location on the shoulder of the tube end piece, making the joint).

The device of the invention is characterized in that it comprises:

a) a sleeve preparing unit provided with a mould cushion and a stop face movable in a direction perpendicular to the plane of a foil band supplied into the unit, where the sleeve can be shaped from the foil band and cut along its circumference and a central circle so as to render the sleeve and its central part easily detachable from the foil band;

b) at least one seaming unit consisting of a seaming element known in itself and movable in a direction perpendicular to the plane of the band, where the sleeve is detached from the band by means of said element, whereupon first the central part of the sleeve and then the ring-shaped sleeve itself are brought into position on the tube end piece and joined fast on it using heat or some other form of radiated energy.

The tube of the invention is characterized in that it has a sleeve ring on the shoulder of the tube end piece and a sealing film covering the end piece orifice, which sleeve ring and sealing film have been formed from the same foil band.

The features characteristic of other preferred embodiments of the invention are presented in the claims to follow.

In the following, the invention is described in detail by referring to the appended drawings, in which:

FIG. 1 presents the seaming unit of the invention in sectional view.

Figure 2:
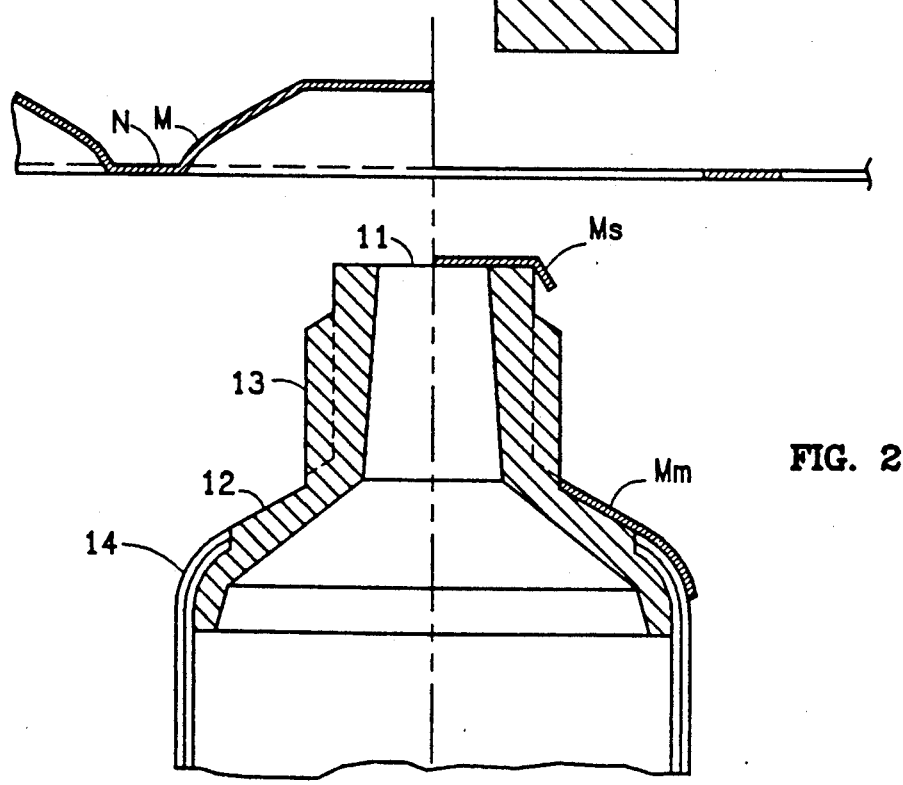

FIG. 2 presents a magnified sectional view of the end piece of a tube being manufactured.

FIG. 1 illustrates the seaming device of the invention. On the left, it has a tube sleeve preparing unit comprising a forming mandrel 1 and its stop face 2, a cutting mandrel 3 movable inside the forming mandrel, a sleeve stretching ring 4 and a mould cushion 5. In addition, the seaming unit is provided with springs 6 and 7, the purpose of which will be explained later. Immediately to the right of the preparing unit is a tube seaming unit consisting of a stop edge 9, which is made of one piece with the stretcher ring 4, and a seaming element 8 provided with heatable joint making surfaces 8A and 8B.

The seaming apparatus of the invention works as follows:

A thin band N of aluminum foil with a polyethylene coating at least on its top side runs through the apparatus. The thickness of the foil band is only a fraction of the thickness of the tube shell material. The cycle of operation starts with the mould cushion 5 and the seaming element 8 rising up towards the stretcher ring 4 and the stop edge 9. The mould cushion 5 and the seaming element 8 can therefore be mounted on the same lifting means (not shown in the drawing). In the sleeve preparing unit the foil band N is pressed between the mould cushion 5 and the stretcher ring 4. The mould cushion 5 and the seaming element 8 continue moving up while spring 6 is compressed, so that the foil band is stretched and shaped into a cup-like sleeve (FIG. 2) between the stop faces 2 of the forming mandrel 1 and the mould cushion 5. After the shaping has been completed, the mould cushion/seaming element combination 5,8 continues moving up until the sleeve thus shaped is nearly cut off from the band by the sharp edge of the mould cushion 5. To prevent the sleeve from being completely cut off, a few notches are provided in the cutting edge of the cushion 5. This technique is known to the person skilled in the art and will not be described here in detail. The cutting can also be implemented as perforation.

After the cutting has taken place the forming mandrel 1 has been pressed against the mould cushion 5. The forming mandrel 1 is then pushed upward by the mould cushion 5, thereby compressing spring 7 and pushing the cutting mandrel 3 slightly out of the forming mandrel 1 and into the opening or cut-out in the mould cushion 5, thereby cutting a circular part nearly off from the shaped sleeve on the same principle as described above.

So far, the mould cushion 5 and the seaming element 8 have been moving up in step as the stop edge 9 of the seaming element and the stretcher ring 5 have been pushed up together by the mould cushion 5. Now, during the operation of the cutting mandrel 3, after the motion of the stretcher ring 4 and the stop edge 9 has ceased, the seaming element 8 continues its upward movement and pushes the sleeve M prepared during the previous stage up against the stop edge 9 so that the sleeve is detached from the band N.

The seaming element 8 continues moving upward until the bottom of the shaped sleeve M touches the surface of the orifice 11 of the tube 10. At this stage, the circular foil section or seal formed by the cutting mandrel 3 is pressed against the edge of the tube end orifice and thereby cut off from the sleeve along the edge between the surfaces 8A and 8B of the seaming element. The ring-shaped sleeve M resting on the seaming surface 8A is pushed further up against the shoulder surface 12 of the tube end.

Next, while seaming surface 8A is in contact with the shoulder surface 12 and seaming surface 8B with the orifice 11, surfaces 8A and 8B are heated in order to weld the sleeve ring together with the shoulder surface 12 so as to produce a joint between the end piece and the tube shell, and, similarly, in order to weld the circular foil section together with the edges of the tube orifice so as to produce a tightly closed seal on it. The seaming is based on the fusion of a polyethylene layer on the upper side of the foil band N and a plastic layer on the tube shell and, on the other hand, on the fusion of said polyethylene layer and a plastic end piece. The underside of the band N is preferably provided with a plastic coating which has a melting point exceeding the seaming temperature and a color suited to the appearance of the tube. However, this is not necessary from the point of view of feasibility of the invention.

Upon completion of the seaming operation, the seamer 8 and the mould cushion 5 are withdrawn to their original position. The new shaped sleeve M thus formed in the band N in the preparing unit moves one step right to be ready for the next seaming operation, while the tube thus seamed is ready to be taken to a tube filling unit or into storage.

FIG. 2 shows a more detailed view of the arrangement of tube end and seaming sleeve. The figure is divided into two halves. In the left-hand half, the band N with a sleeve M formed in it runs in the upper part of the figure, and below is the tube end prior to seaming. Shown on the right are the band N after removal of the sleeve and the tube end after the seaming. Viewing the figure from left to right, one can see that the sleeve M prepared as provided by the invention is brought into position over a tube end piece 13 provided with a tube shell 14, ready for seaming. During seaming, first the circular middle part Ms of the sleeve foil is brought onto the tube end orifice 11 to form a seal on it, and next the sleeve itself, now a ring-shaped cup Mm without a bottom, is brought onto the shoulder 12 of the end piece 13 to join the end piece and the tube shell 14 together as explained above in connection with FIG. 1.

It is obvious to a person skilled in the art that different embodiments of the invention are not restricted to the examples described above, but that they may instead be varied within the scope of the following claims. Thus, the heating effect produced by the seaming element on the plastic layers to be fused may be based on ultrasonic welding or microwave heating, and the plastic layer on the upper side of the band N may consist of any suitable polymer.

I claim:

1. Method for seaming the end of a tube, in which method the shell of the tube is placed onto the shoulder of an end piece, a sleeve ring is placed where a joint is to be formed, and the seaming is effected by smelting in a seaming element a plastic layer provided on the sleeve ring, tube shell and/or end piece, wherein the method comprises the following stages:
    a) a sleeve is shaped and cut and/or perforated from a linear foil band in such a way that the sleeve is not yet detached from the band but is easily detachable when brought into a tube end seaming unit;
    b) the sleeve thus prepared is moved along with the band into the seaming unit, where the sleeve is first detached from the band by being struck by a seaming element moving in a direction perpendicular to the plane of the band;
    c) as the seaming element moves up, the sleeve is moved along with it onto the orifice of the tube end piece, where the central part of the sleeve is cut off and forms a sealing cover on the orifice;
    d) the ring-shaped sleeve thus produced is moved onto the shoulder of the tube end piece, where it is pressed against the end piece shoulder and the end of the tube shell, covering the joint between them;
    e) the seaming element is brought by heating into a condition causing the smelting of a plastic layer provided in the sleeve and/or tube shell, and, essentially simultaneously and in step, the sleeve ring is joined with the shoulder of the end piece while the central part of the sleeve, which was left on the end piece orifice, is joined with the edges of the end piece orifice to produce a sealing cover on it.

2. Method according to claim 5 wherein the sleeve is shaped from the foil band by stretching it so as to form a cup of a shape corresponding to that of the shoulder part of the end piece, whereupon the sleeve is so cut that it is nearly separated from the foil band.

3. Method according to claim 1, wherein the shaping, cutting and/or perforation of the sleeve are performed essentially simultaneously with the seaming on a tube end piece of at least one other sleeve, the next one in the direction of motion of the band.

4. Device for the seaming of a tube end piece, designed for implementing the method of claim 1, wherein the device comprises:
    a) sleeve preparing unit provided with a mould cushion and a stop face movable in a direction perpendicular to the plane of a linear foil band supplied into the unit, where the sleeve can be shaped from the foil band and substantially cut along its circumference and a central circle so as to render the sleeve and its central part easily detachable;

b) at least one seaming unit consisting of a seaming element and movable in a direction perpendicular to the plane of the band, where the sleeve can be detached from the band by means of said element, whereupon first the central part of the sleeve and then the ring-shaped sleeve itself can be brought into position on the tube end piece and joined together with it using heat.

5. Device according to claim 4, wherein the sleeve preparing unit is provided with a cutting mandrel which is thrust out through the middle of the stop face to form an easily detachable central part in the sleeve.

6. Device according to claim 4, wherein the sleeve preparing unit and the seaming units operate in step using adjacent stop faces and stop edges made of one piece.

7. A method of sealing a tube comprising a tube shell having an end piece, the end piece having a shoulder and an orifice, the method comprising the steps of:

shaping a sleeve from a linear foil band such that the sleeve includes a detachable center piece;

detaching the center piece from the sleeve;

sealing the sleeve to a joint located where the shoulder of the end piece engages the end of the tube shell; and substantially simultaneously sealing the detached center piece of the sleeve to the orifice of the end piece.

* * * * *